United States Patent Office 3,550,079
Patented Dec. 22, 1970

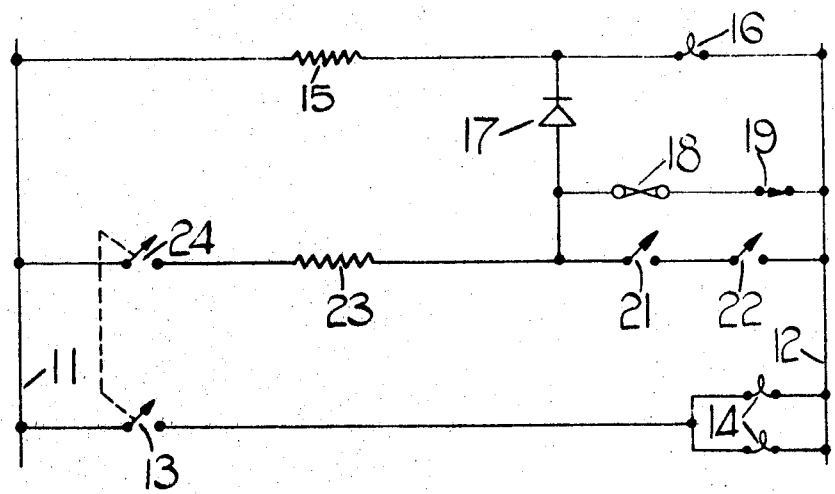

3,550,079
WARNING DEVICES FOR VEHICLE BRAKING SYSTEMS
Stanley Clifford, Mount Nod, England, assignor to Girling Limited, Tyseley, Birmingham, England, a British company
Filed Sept. 8, 1967, Ser. No. 666,322
Int. Cl. B60t 17/22
U.S. Cl. 340—52     3 Claims

ABSTRACT OF THE DISCLOSURE

A warning device for indicating loss of pressure in a braking system on a vehicle includes a switch which is actuated when the pedal is depressed to a predetermined position. If the pressure rises in the system normally, then one or more further switches will be operated by the pressure before the pedal switch is actuated, and in these circumstances no warning will be given. However, if the pressure does not rise for any reason, then the pressure-operated switch or switches are not operated and when the pedal switch is actuated the warning is given.

---

This invention relates to warning devices for vehicle braking systems.

A device according to the invention comprises means sensitive to the pressure in the system and to the position of the brake pedal of the vehicle for giving a warning when the brake pedal is depressed a predetermined amount unless the pressure in the system has risen above a predetermined value.

The accompanying drawing is a circuit diagram illustrating one example of the invention as applied to a tandem braking system, that is a braking system which is duplicated on a road vehicle, both parts of the braking system being operated by the same brake pedal.

Referring to the drawing, there are provided negative and positive lines 11, 12, which in use are energised by the battery of a vehicle. The brake pedal of the vehicle serves when depressed to operate a normally open switch 13, one side of which is connected to the line 11, and the other side of which is connected to the line 12 through the stop lamps 14 of the vehicle in parallel, so that the stop lamps are operated in the normal way. The lines 11, 12 are further interconnected through a resistor 15 in series with a warning lamp 16 which is visible to the driver of the vehicle, the junction of the resistor 15 and lamp 16 being connected to the cathode of a diode 17. The anode of the diode 17 is connected to the line 12 through a fuse 18 and a normally closed switch 19 in series, and is further connected to the line 12 through a pair of normally open pressure sensitive switches 21, 22 in series, the switches 21, 22 being connected in the two parts of the system and being designed to close when the pressures in the two parts of the system respectively reach their predetermined value. The anode of the diode 17 is further connected to the line 11 through a resistor 23 in series with a normally open switch 24, the switch 24 being operated by the brake pedal of the vehicle, and the arrangement being such that after the switch 13 is closed. a further movement of about 0.5 inch of the brake pedal serves to close the switch 24.

Assuming that both parts of the braking system are operating satisfactorily, the operation is as follows. Current flows through the resistor 15, and part of this current then flows through the warning lamp 16, the remainder flowing through the series circuit including the diode 17, fuse 18 and switch 19. At this stage, the current flowing through the lamp 16 is insufficient to illuminate it. When the brake pedal of the vehicle is depressed, the switch 13 closes to energise the stop lamps 14, and as the brake pedal is further depressed, the pressure in the system rises. The rising pressure caused the switches 21, 22 to close before the switch 24 closes, and when the switch 24 closes, current flowing through the resistor 23 can flow through the switches 21, 22 in series, as well as through the fuse 18 and switch 19.

In the event that there should be a fault in any part of the system resulting in failure of the pressure to rise when the brake pedal is depressed, then when the switch 24 closes, one or both of the switches 21, 22 will be open. In such circumstances, current flowing through resistor 23 when the switch 24 closes causes the fuse 18 to blow, and as a result the entire current flowing through the resistor 15 now flows through the warning lamp 16, which is illuminated to give the required warning. The warning lamp 16 will then only be extinguished again if the pressure rises sufficiently to ensure that both switches 21, 22 are closed.

The switch 19 is positioned os that it is readily accessible to the driver, and is used to test the system.

Having thus described my invention what I claim as new and desire to secure by Letters Patent is:

1. A warning device for vehicle breaking systems for giving a warning when a brake pedal of the system is depressed a predetermined amount unless the pressure in the braking system has risen above a predetermined value, said warning device comprising in combination a pair of electrical supply lines, a warning lamp connected between said supply lines for giving the warning, a fuse connected in a circuit across said lamp, said fuse diverting sufficient current from said lamp to ensure that it is not illuminated, a switch which is closed when said brake pedal is depressed beyond said predetermined amount, said switch when closed being capable of supplying sufficient current to the fuse to blow the fuse, and a by-pass circuit through which current flowing through said switch can flow to prevent the fuse blowing, said by-pass circuit including at least one pressure sensitive switch which closes at said predetermined value of pressure and which, when the system is operating satisfactorily, closes before said switch controlled by the brake pedal.

2. A device as claimed in claim 1 in which the brake pedal operates a tandem braking system, and the by-pass circuit includes two pressure sensitive switches operated by the pressures in the two fluid circuits controlled by the pedal.

3. A device as claimed in claim 1 including a normally closed test switch in series with the fuse.

References Cited

UNITED STATES PATENTS 3,439,323   4/1969   Kersting _____ 340—69X

ALVIN H. WARING, Primary Examiner

U.S. Cl. X.R.

200—61.89